United States Patent [19]

Gula et al.

[11] Patent Number: 5,582,737
[45] Date of Patent: Dec. 10, 1996

[54] ION EXCHANGE AND REGENERATION PROCESS FOR SEPARATION AND REMOVAL OF IRON (III) IONS FROM AQUEOUS SULFURIC ACID METAL ION-CONTAINING SOLUTIONS

[75] Inventors: Michael J. Gula, Chicago, Ill.; David B. Dreisinger, Delta, Canada; E. Philip Horwitz, Naperville, Ill.

[73] Assignee: Eichrom Industries, Inc., Darien, Ill.

[21] Appl. No.: 554,472

[22] Filed: Nov. 7, 1995

[51] Int. Cl.[6] .................................... C02F 1/42
[52] U.S. Cl. .................. 210/673; 210/688; 210/670; 423/531; 204/DIG. 13
[58] Field of Search ................. 210/688, 670, 210/672, 673; 423/531; 204/DIG. 13

[56] References Cited

U.S. PATENT DOCUMENTS

| | | | |
|---|---|---|---|
| 3,224,873 | 12/1965 | Swanson | 75/101 |
| 3,440,036 | 4/1969 | Spinney | 75/117 |
| 3,761,249 | 9/1973 | Ritcey et al. | 75/101 |
| 4,083,758 | 4/1978 | Hamby et al. | 204/106 |
| 4,100,043 | 7/1978 | Chou et al. | 204/108 |
| 4,167,481 | 9/1979 | Cremers et al. | 210/688 |
| 4,272,492 | 6/1981 | Jensen | 423/24 |
| 4,329,210 | 5/1982 | Merchant et al. | 204/107 |
| 4,350,667 | 9/1982 | Andersson et al. | 423/24 |
| 4,559,216 | 12/1985 | Nagai et al. | 423/531 |
| 4,900,522 | 2/1990 | Chou et al. | 423/139 |
| 5,108,615 | 4/1992 | Hosea et al. | 210/688 |
| 5,112,392 | 5/1992 | Anderson et al. | 210/726 |
| 5,192,418 | 3/1993 | Hughes et al. | 210/688 |
| 5,281,631 | 1/1994 | Horwitz et al. | 210/681 |
| 5,449,462 | 9/1995 | Horwitz et al. | 210/682 |
| 5,451,323 | 9/1995 | Akao et al. | 210/665 |
| 5,500,126 | 3/1996 | Fries | 210/688 |
| 5,520,814 | 5/1996 | Celi | 210/638 |

Primary Examiner—Cynthia L. Nessler
Attorney, Agent, or Firm—Welsh & Katz, Ltd.

[57] ABSTRACT

An ion exchange separation, recovery and regeneration process for the control of iron has been developed to replace the conventional bleed stream process used in copper electrowinning. The process minimizes the loss of cobalt from the electrowinning circuit and strips the iron into a sulfate-based solution suitable for leach solution makeup. In addition, this process can effect a lowering of the total iron concentration in the electrolyte circuit with an associated increase in current efficiency.

20 Claims, 5 Drawing Sheets

ION EXCHANGE AND REGENERATION PROCESS FOR SEPARATION AND REMOVAL OF IRON (III) IONS FROM AQUEOUS SULFURIC ACID METAL ION-CONTAINING SOLUTIONS

DESCRIPTION

1. Technical Field

The present invention relates to a process for separating and removing iron(III) ($Fe^{3+}$ ions) from an aqueous sulfuric acid metal-ion containing solution, and particularly to a process for such removal from a spent electrolyte solution obtained in a solvent extraction, copper electrowinning solution.

2. Background of the Invention

Copper metal is obtained from copper ores by several well-known processes. One of the most frequently used processes is referred to as a solvent extraction-electrowinning (SX-EW) process in which copper ions are first leached from the ore using sulfuric acid followed by extraction with a kerosene-type solvent and then electroplating of the copper from the extracted sulfuric acid electrolyte solution.

As copper is depleted from the $CuSO_4$-$H_2SO_4$ electrolyte solution during copper electrowinning from a solvent extracted solution of copper ore leachate, the concentration of iron in solution increases. This build up of iron in solution results in a loss of current efficiency in the electrowinning process due to a continuous oxidation/reduction of $Fe^{2+}$/$Fe^{3+}$. That loss of current efficiency can amount to about 2–3 percent per gram of iron ions in solution. The conventional treatment technique for iron control has been to periodically bleed a portion of the iron-rich, copper-depleted electrolyte and replace it with a copper-rich electrolyte solution having a lower iron concentration.

In a copper electrowinning process, lead based alloys are used as oxygen-evolving anodes. Soluble cobalt (50–200 ppm) is added to the aqueous sulfuric acid copper-containing electrolyte to control corrosion of the lead anode, and to prevent "spalling" and possible lead contamination of the copper cathode. During bleed of the spent (copper-depleted) electrolyte to control iron concentration, cobalt is lost from the system. Cobalt must be continually added to the electrowinning electrolyte to make up cobalt lost through the bleed stream. Cobalt replacement to control lead anode corrosion is a major operating expense in copper SX-EW plants.

Sulfonic acid functional group cation resins are widely used in the water treatment industry and other industrial processes. These resins have excellent stability and capacity characteristics under most conditions. But some circumstances exist that limit the ability of sulfonic acid-based resins to capture and retain certain metallic species. In these circumstances, it is necessary to consider other potential functional groups to improve both the performance and cost-effectiveness of the ion exchange process.

There are two principal examples of conditions not satisfactorily handled by resins with sulfonic acid functional groups. Solutions that are strongly acidic in nature prevent metal exchange onto sulfonic acid exchange sites. In some metals removal applications, the sulfonic acid group can accumulate copious amounts of calcium, magnesium, and sodium. The accumulation of non-targeted ions exhausts the resin's capacity and necessitates frequent regeneration. Increased regeneration, in turn, results in increased waste volume and higher operating costs.

Gem-diphosphonic acid ion exchange particles were developed to overcome the limitations of conventional sulfonic acid resins. The key aspect of the exchange capacity of these materials is based on gem-diphosphonic acid functional groups that produce tighter binding of multivalent metal species. The tighter binding of multivalent metal species improves the retention of target metals under adverse conditions, whereas conventional sulfonic acid functionality is retained to improve exchange kinetics. The performance of the dual functionality that is preferably present is quantified by the development of the particles' distribution ratios for specific contaminants.

As is disclosed in U.S. Pat. No. 5,449,462 and No. 5,281,631 whose disclosures are incorporated by reference, the observed distribution ratios for metallic species under both strongly acidic and neutral water conditions with gem-diphosphonic acid ion exchange particles are more than 100 times higher than those observed for a typical cation resin. These distribution values highlight the ability of the gem-diphosphonic acid ion exchange particles to dramatically bind metals in a number of applications.

The total theoretical capacity of gem-diphosphonic acid ion exchange particles for a specific metal ion depends on the molecular weight of the ion. For example, the total capacity of exemplary gem-diphosphonic acid particles for Fe(III) is about 39 mg per gram of resin, whereas for U(VI) it is 166 mg per gram of resin.

A possible disadvantage of use of gem-diphosphonic acid ion exchange particles is also the fact that they bind specific metal cations so tightly. Thus, it can be difficult or too costly to regenerate the ion exchange particles once they have bound their target metal ions. Such tight binding is extremely desirable where the particles are used to decontaminate a solution as where U(VI) ions are to be removed and the particles and bound ions are disposed of. A single use can be economically feasible where radionuclides are to be removed, but regeneration must occur where less hazardous metal ions are to be separated and removed.

A process that separates and removes iron(III) from aqueous sulfuric acid solution containing additional metal ions such as copper and cobalt ions as are found in depleted copper electrowinning electrolyte solutions has been developed. This process utilizes gem-diphosphonic acid ions exchange particles to remove the ion(III) ions, while permitting (1) copper, cobalt and other mono- and divalent metal ions to be recycled into the copper recovery process, thereby saving on the costs of cobalt that would otherwise be discarded, and (2) regeneration of the ion exchange particles for further use and recycled separation and removal steps. This process is discussed in the disclosure that follows.

BRIEF SUMMARY OF THE INVENTION

The present invention relates to the separation and removal of iron(III) ions ($Fe^{3+}$ ions) from an aqueous sulfuric acid solution containing other metal ions having a valence of less than +3. In accordance with this invention, a contemplated ion exchange and regeneration process for the separation and removal of iron(III) ions from an aqueous sulfuric acid metal ion-containing solution comprises the steps of:

(a) contacting an aqueous sulfuric acid metal ion-containing solution that contains iron(III) ions as well as ions having a valence of less than +3 of at least one additional metal with solid ion exchange particles that bind to said iron(III) ions in preference to the additional metal ions present to form a solid/liquid phase admixture. Those ion exchange particles comprise insoluble cross-linked copolymer particles having a plurality of pendent geminal diphosphonate groups of the formula —$CH(PO_3R_2)_2$ or >$C(PO_3R_2)_2$, wherein R is a mono- or divalent cation such as hydrogen, ammonium, an alkali metal cation, or $R_2$ is a divalent cation.

(b) That contact is maintained with a sufficient amount of the solid ion exchange particles for a time period sufficient to form solid phase-bound iron(III) ions and an aqueous liquid phase containing sulfuric acid and the additional metal ions.

(c) The solid and liquid phases are separated.

(d) The separated solid phase-bound iron(III) ions are contacted with an aqueous reducing solution containing 0.5 to about 6 molar sulfuric acid, at least a catalytic amount of copper ions and an amount of sulfurous acid sufficient to reduce the solid phase-bound iron(III) ions to iron(II) ions to form a second solid/liquid phase admixture.

(e) The second solid/liquid phase admixture is maintained at a temperature of about 65° C. to about 85° C. for a time period sufficient to form an aqueous sulfuric acid liquid phase containing iron(II) ions and regenerated solid phase ion exchange particles.

(f) The iron(II)-containing liquid phase is then separated from the solid phase ion exchange particles.

BRIEF DESCRIPTION OF THE DRAWINGS

In the drawings forming a part of this disclosure.

Figure 1:
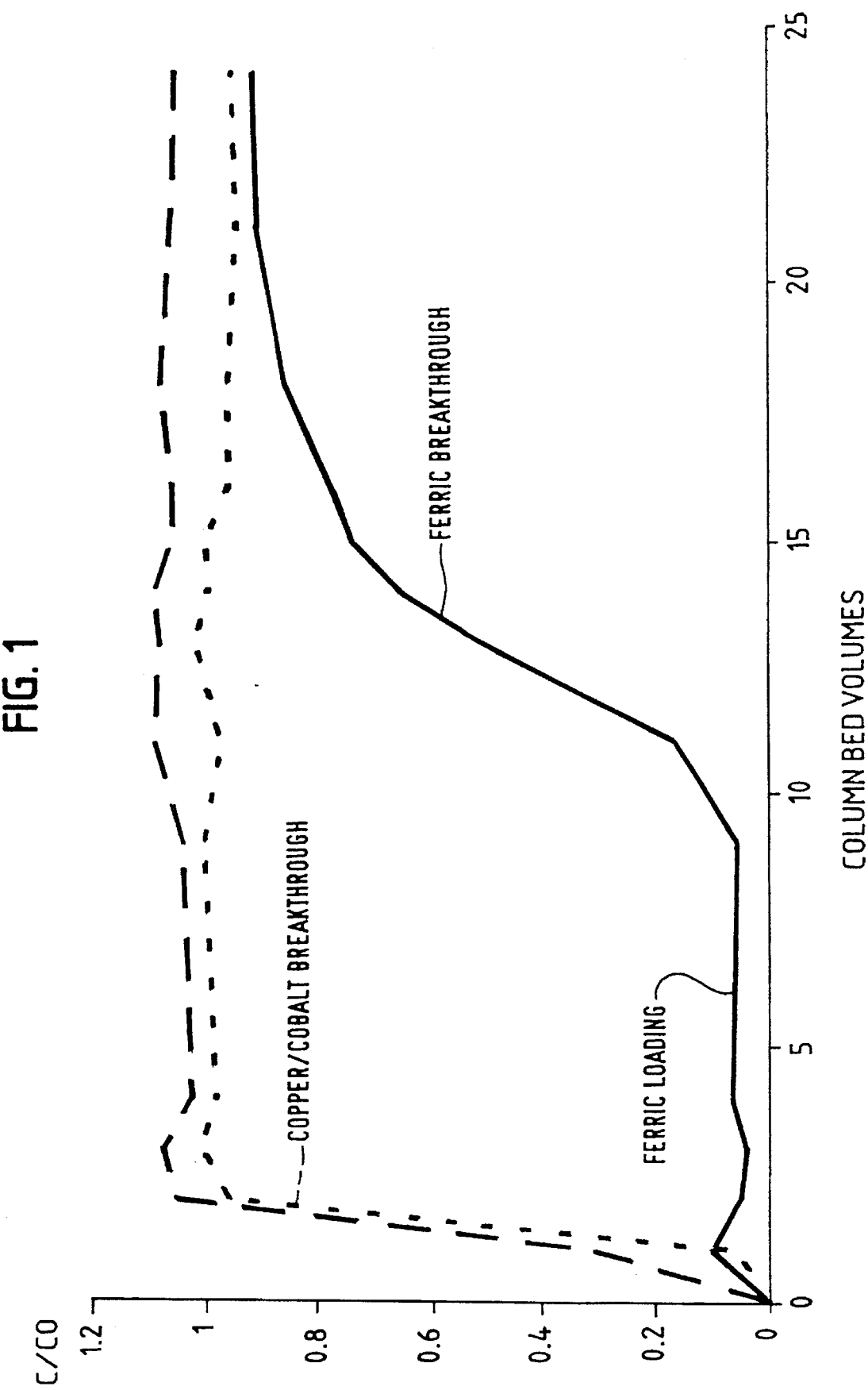
FIG. 1 is a graph of loading curves obtained using simulated copper electrolyte bleed solutions containing $Fe^{3+}$, $Cu^{2+}$ and $Co^{2+}$ ions in an aqueous sulfuric acid (150 g/L $H_2SO_4$) solution. The ordinate is in units of the ratio of processed solution concentrations $C/C_o$ (C=effluent concentration and $C_o$=feed concentration) versus the effluent through put in column bed volumes. Initial concentrations were $Fe^{3+}$=1250 mg/L (solid line); $Cu^{2+}$=40 g/L (dotted line); and $Co^{2+}$=100 mg/L (dashed line). Regions of the curves at which particle loading and ion breakthrough occur are noted with arrows.

The present invention has several benefits and advantages.

A benefit of the invention is that a contemplated process effectively separates $Fe^{3+}$ ions from a depleted copper electrowinning electrolyte that contains cobalt ions so that the cobalt ions can be returned to the electrowinning solution, thereby eliminating the requirement for continuing purchases of large quantities of that expensive metal.

An advantage of a contemplated process is that the ion exchange particles can be regenerated and reused at least several hundred times.

Another benefit of a contemplated process is that, aside from the ion exchange particles and attendant equipment, no chemicals are added to the electrowinning process solutions that are not otherwise already present, thereby minimizing disruption to an on-going process.

Another advantage of a contemplated process is that the only chemical addition occurs during regeneration of the ion exchange particles, a step that is outside of the process loop. That addition itself uses sulfurous acid that is converted to sulfuric acid during regeneration, and sulfuric acid is already present in the system.

Yet another benefit of a contemplated process is that copper electrowinning plants are often located near smelting operations that produce sulfur dioxide ($SO_2$) from which sulfurous acid is produced. Thus, $SO_2$ that can be a smelting pollutant can often be recovered on or near the electrowinning plant, thereby lessening pollution from the smelter and saving on the cost of raw materials used in a contemplated process.

Still further benefits and advantages will be apparent to the skilled worker from the discussion that follows.

DETAILED DESCRIPTION OF THE INVENTION

The present invention contemplates a process for the separation and removal of iron(III) ions from an aqueous sulfuric acid solution that also contains additional metal cations having a valence of less than +3. Embodiments of a contemplated process are described herein in terms of electrolyte solutions present in copper SX-EW processes whose metal ions include iron(III), iron(II), copper(II), copper(I), cobalt(II), and sometimes manganese(II).

In accordance with this invention, one contemplated embodiment is an ion exchange and regeneration process for the separation and removal of iron(III) ions from an aqueous sulfuric acid metal ion-containing solution. This process comprises the steps of:

(a) contacting an aqueous sulfuric acid metal ion-containing solution that contains iron(III) ions as well as ions having a valence of less than +3 of at least one additional metal with solid ion exchange particles that bind to the iron(III) ions in preference to the additional metal ions present to form a solid/liquid phase admixture. Those ion exchange particles comprise insoluble cross-linked copolymer particles having a plurality of pendent geminal diphosphonate groups of the formula —CH(PO$_3$R$_2$)$_2$ or >C(PO$_3$R$_2$)$_2$, wherein R is a mono- or divalent cation.

(b) That contact is maintained with a sufficient amount of the solid ion exchange particles for a time period sufficient to form solid phase-bound iron(III) ions and an aqueous liquid phase containing sulfuric acid and the additional metal ions.

(c) The solid and liquid phases are separated.

(d) The separated solid phase-bound iron(III) ions are contacted with an aqueous reducing solution containing 0.5 to about 6 molar sulfuric acid, at least a catalytic amount of copper ions and an amount of sulfurous acid sufficient to reduce the solid phase-bound iron(III) ions to iron(II) ions to form a second solid/liquid phase admixture.

(e) The second solid/liquid phase admixture is maintained at a temperature of about 65° C. to about 85° C. for a time period sufficient to form an aqueous sulfuric acid liquid phase containing iron(II) ions and regenerated solid phase ion exchange particles.

(f) The iron(II)-containing liquid phase is separated from the solid phase ion exchange particles.

A contemplated aqueous sulfuric acid metal ion-containing solution is typically a spent or copper-depleted copper electrowinning solution. A contemplated solution can have a sulfuric acid concentration that is from about 0.1 molar to about 8 molar, but more typically and preferably has a sulfuric acid concentration of about 1 to about 3 molar.

The metal cations present in such a solution can include iron(II), iron(III), copper(II), cobalt(II), and can sometimes include manganese(II) ions. Of those cations, iron ions are typically present at about 1 to about 10 grams/liter (g/L) as iron(III) or a mixture of iron(II) and iron(III) ions. When present as a mixture, as is obtained from a depleted EW solution, iron(II) is typically present at about 15 to about 25 percent of the total iron present. Copper(II) ions are present at about 30 to about 50 g/L, and cobalt ions are typically present at about 0.05 to about 0.2 g/L. Manganese(II) ions can be present at less than about 0.005 to about 0.12 g/L.

Turning now to the ion exchange particles, those water-insoluble particles contain pendent geminal diphosphonate groups such as those that have the formula —CH(PO$_3$R$_2$)$_2$ or >C(PO$_3$R$_2$)$_2$, wherein R is a mono- or divalent cation such as hydrogen (a proton), ammonium ion (NH$_4^+$) including also a C$_1$–C$_4$ mono-, di-, tri- or tetra-alkyl ammonium ion as are well known, or an alkali metal cation such as lithium, sodium or potassium, or R$_2$ (i.e., two R groups together) are a divalent cation. Any divalent cation can be present such as an alkaline earth metal cation like magnesium, calcium or barium, cobalt(II), iron(II) or manganese(II). Thus, under the conditions of this process, iron(III) displaces any mono- or divalent cation that may have originally been present neutralizing the phosphonate groups.

The pendent geminal diphosphonate groups of these particles can exchange and also bind to (complex) cations, with complexation usually predominating in strongly acidic conditions; i.e., 1 M nitric acid or sulfuric acid, and exchange occurring at higher pH values. These materials are cation exchangers.

A contemplated particle can be prepared from a variety of monomers, and three particular copolymer particles are preferred.

A first of these materials is a tetrapolymer whose synthesis and properties are discussed in U.S. Pat. No. 5,281,631, whose disclosures are incorporated herein by reference. These particles are available from Eichrom Industries, Inc. of Darien, Ill. under the name EICHROM'S DIPHONIX™ and are used illustratively herein. Use of EICHROM'S DIPHONIX™ ion exchange particles is particularly preferred.

EICHROM'S DIPHONIX™ ion exchange particles are prepared by the copolymerization of four groups of monomers. Vinylidene diphosphonic acid or the alkyl or aryl esters thereof constitute one monomer group. These monomers on polymerization provide —CH$_2$—C(PO$_3$R$_2$)$_2$— repeating units that have geminal diphosphonate groups of the formula >C(PO$_3$R$_2$)$_2$, wherein "—" represents a single bond from the depicted carbon atom, and ">" represents two bonds from the carbon at the apex. The second monomer group comprises acrylamide or styrene, whereas the third group comprises acrylonitrile, methyl acrylate and methyl methacrylate. The fourth group comprises a divinylic or trivinylic cross-linking agent such as divinylbenzene, trimethylolpropane trimethacrylate, trivinylbenzene, diethyleneglycol diacrylate and N,N'-methylene-bis-acrylamide. Divinylbenzene often contains ethyl vinyl benzene as an impurity whose presence does not impair the efficacy of the particles.

Thus, a tetrapolymer is prepared by copolymerizing one monomer from each of the above four monomer groups. The diphosphonate-containing monomer is usually copolymerized as a tetraalkyl or tetraaryl ester whose ester groups are hydrolyzed off after completion of the reaction. A preferred synthesis for this monomer is disclosed in U.S. Pat. No. 5,256,808, whose disclosures are also incorporated by reference.

Styrene is a particularly preferred monomer of the second group and acrylonitrile is a particularly preferred monomer of the third group. When styrene is a copolymerized monomer, it is particularly preferred to sulfonate the copolymer particle beads (particles) to provide a copolymer having pendent phenylsulfonate groups. Any sulfonating agent can be used. Use of chlorosulfonic acid as sulfonating agent with a one hour reaction time at room temperature provides complete sulfonation of the phenyl rings. Subsequent hydrolysis with sodium hydroxide converts the formed chlorosulfonic acid groups to the desired sulfonate groups. Such sulfonation provides particles with enhanced hydrophilicity and microporosity and also typically hydrolyzes some pendent nitrile and ester groups to form pendent carboxylate groups, as well as hydrolyzing the diphosphonate tetraalkyl esters.

A second type of contemplated ion exchange particle has pendent geminal diphosphonate groups of the formula —CH(PO$_3$R$_2$)$_2$ that are added to a preformed water-insoluble cross-linked copolymer by grafting; i.e., the pendent phosphonate groups are added after copolymer particle formation.

A contemplated particle comprises an insoluble cross-linked copolymer having grafted pendent groups of the formula wherein R is a mono- or divalent cation as discussed before; and R$^1$ is hydrogen or a C$_1$–C$_2$ alkyl group, wherein phosphorus-containing pendent groups are present at 1.0 to about 10 mmol/g dry weight of the copolymer, and the mmol/g values are based on the polymer where R$^1$ is hydrogen. The particle also contains zero to about 5 mmol/g dry weight of pendent aromatic sulfonate groups that can be added by sulfonation to polymerized aromatic groups such as styrene or a C$_1$–C$_3$ alkyl styrene.

A contemplated pendent methylene diphosphonate as first formed can contain a C$_1$–C$_8$ alkyl phosphonate ester groups. Exemplary C$_1$–C$_8$ alkyl groups of those esters and other C$_1$–C$_8$ alkyl groups noted herein include methyl, ethyl, propyl, isopropyl, butyl, t-butyl, pentyl, cyclopentyl, hexyl, cyclohexyl, 4-methylcyclopentyl, heptyl, octyl, cyclooctyl, 3-ethylcyclohexyl and the like, as are well known. An isopropyl group is a preferred R group. An $R^1$ $C_1$–$C_2$ alkyl group is a methyl or ethyl group.

After formation, the alkyl ester groups are hydrolyzed so that for use, R in the above formula is a mono- or divalent cation, exemplary cations include hydrogen (a proton), ammonium ion, an alkali metal such as lithium, sodium and potassium ions, or $R_2$ is $Ca^{+2}$, $Mg^{+2}$ or the like.

As is the case of ion exchange resins generally, an R cation of a contemplated ion exchange resin can be changed at will from a first cation (including a proton) to a second cation by simply washing an aqueous composition of a resin first cation salt with an aqueous solution having an excess of the second cation. These procedures are well known and need not be discussed further.

The reacted monomers of a contemplated copolymer are quite varied. Exemplary reacted monomers are styrene, ethyl styrene, vinyltoluene, vinylxylene, acrylonitrile, a $C_1$–$C_8$ alkyl acrylate or methacrylate, a vinyl $C_1$–$C_8$ acyl ester, vinylchloride, a $C_1$–$C_8$ alkyl vinyl ether, and a vinyl benzylhalide such as α-bromo- or α-fluoromethyl styrene.

A contemplated $C_1$–$C_8$ acyl group is an acyl form of one of the above $C_1$–$C_8$ alkyl groups, as appropriate. Some $C_1$–$C_8$ alkyl groups such as cyclohexyl and t-butyl do not have corresponding acyl groups as is well known.

A contemplated insoluble copolymer must contain at least 1.0 mmol/g dry polymer weight and preferably about 2.0 mmol/g of a reacted (copolymerized) vinylbenzyl halide so that the above amount of pendent geminal diphosphonate groups can be prepared. In addition, where a pendent aromatic sulfonate is present as is preferred, an appropriate amount of reacted aromatic monomer such as styrene, vinyl toluene or the like must also be present.

Preferably, the insoluble copolymer contains at least 2 mole percent reacted vinylbenzyl halide, with that percentage more preferably being about 10 to about 95 mole percent. One or more reacted monoethylenically unsaturated monomers as discussed before are present at about 2 to about 85 mole percent, with the reacted monoethylenically unsaturated monomer preferably including at least 5 mole percent of an above monoethylenically unsaturated aromatic monomer such as styrene, ethyl styrene, vinyl toluene (methyl styrene) and vinyl xylene.

A useful insoluble copolymer also includes a reacted cross-linking agent (cross-linker). Reacted cross-linking agents useful herein are also quite varied. Exemplary cross-linking agents useful herein are selected from the group consisting of divinylbenzene, trimethylolpropane triacrylate or trimethacrylate, erythritol tetraacrylate or tetramethacrylate, 3,4-dihydroxy-1,5-hexadiene and 2,4-dimethyl-1,5-hexadiene. Divinylbenzene is particularly preferred here.

The amount of reacted cross-linker is that amount sufficient to achieve the desired insolubility. Typically, at least 0.3 mole percent reacted cross-linker is present. The reacted cross-linking agent is preferably present at about 2 to about 20 mole percent.

These contemplated particles are the multi-step reaction product of a nucleophilic agent such as $CH[P(O)(OR^2)_2]^-$, which can be obtained by known methods, with a substrate. Thus, $CH_2[P(O)(OR^2)_2]$, where $R^2$ is a $C_1$–$C_8$ alkyl ester group, is first reacted with sodium or potassium metal, sodium hydride or organolithium compounds, e g., butyllithium, or any agent capable of generating a diphosphonate carbanion. The resulting carbanion is then reacted with a substrate that is a before-discussed insoluble cross-linked copolymer of one or more of vinyl aliphatic, acrylic, or aromatic compounds and a polyvinyl aliphatic, acrylic, or aromatic compound, e.g., divinylbenzene. That copolymer contains at least 2 mole percent of a reacted halogenated derivative of vinyl aromatic hydrocarbon such as vinylbenzyl chloride, preferably from 10 to 95 mole percent, about 2 to about 85 mole percent of monovinyl aromatic hydrocarbon such as styrene and at least 0.3 mole percent of polyvinyl aliphatic and/or aromatic cross-linker such as divinylbenzene, preferably 2–20 mole percent.

A suitable insoluble, cross-linked copolymer can be obtained by any well known method used in styrene (e.g., suspension and emulsion) polymerization but the suspension method is preferred because the insoluble copolymer is formed as beads suitable for column separation processes and the diameter of the beads can be easily controlled. Such polymerization can be performed in the presence of no solvent; i.e., neat or without diluent as a bulk polymerization, to about 90 weight percent of inert solvent or diluent such as alcohols, aliphatic and aromatic hydrocarbons or any of their mixtures. The vinyl aromatic compounds can contain lower alkyl groups with 1 to 3 carbon atoms in addition to the vinyl group. Examples of such monomers are vinyltoluene and vinylxylene.

The next step in preparing contemplated particles is the substitution of a methylene diphosphonate group for the halogen atom in the halomethyl groups on the aromatic units (e.g., vinylbenzyl chloride). The copolymer containing such units is reacted with the carbanion $CH[P(O)(OR^2)_2]_2^-$. Halogen is thereby displaced from the halomethyl groups, and a polymeric resin containing pendent methylene diphosphonate groups is formed.

The reaction of tetraalkyl methylene diphosphonate (after it is converted into a carbanion with sodium or potassium metal, sodium hydride, butyllithium, etc.) with insoluble, cross-linked copolymer containing halomethyl groups to graft the phosphorous-containing pendent groups can be carried out at temperatures between about −25° and about 250° C., preferably from about 100° to about 170° C. The reaction is preferably carried out while the copolymer is swollen by an organic solvent such as toluene, xylenes, ethylbenzene or mesitylene.

Thus, the reaction is preferably carried out by swelling a before-discussed insoluble cross-linked polymer in one of the aforementioned solvents for 0.1–2 hours at a temperature from ambient temperature to the boiling point of the solvent, and subsequent addition of a 1- to 5-fold excess of tetraalkyl methylene diphosphonate carbanion in a small amount of the same solvent. Reaction is usually carried out by refluxing a mixture at atmospheric pressure for one to 48 hours, preferably 10 to 24 hours.

The grafted copolymer product so prepared is recovered by separation from the liquid by filtering, centrifugation, decantation and the like. The grafted copolymer can be washed with organic solvents such as benzene, toluene or ethylbenzene to free the product of unreacted tetraalkyl methylene diphosphonate and dried.

The copolymer containing grafted methylene diphosphonate tetraalkyl ester groups in an amount corresponding to about 1.0 mmol/g of dry weight, preferably from 2 to 7 mmol/g of dry weight, is preferably reacted with a sulfonating agent such as chlorosulfonic acid, concentrated sulfuric acid or sulfur trioxide in order to introduce strongly acidic pendent aromatic sulfonic groups (shown below in pertinent part as before) into their structure. The presence of the sulfonate pendent groups confers the additional advantage of hydrophilicity to the particles and leads to a surprising enhancement in the rate of cation complexation without adversely affecting the observed selectivity.

The reaction of the sulfonating agent with a grafted copolymer containing methylene diphosphonate groups is usually carried out when the recovered resin product in ester form is swollen by a halohydrocarbon such as dichloromethane, ethylene dichloride, chloroform and 1,1,1-trichloroethane. The sulfonation reaction can be performed using 0.5 to 20.0 weight percent of chlorosulfonic acid in one of the mentioned halohydrocarbon solvent at temperatures ranging from about −25° to about 50° C., preferably at about 10° to about 30° C. The reaction is carried out by contacting resin preswollen for zero (unswollen) to about two hours with the above sulfation solution for 0.25 to 20 hours, preferably 0.5 to two hours.

After completion of the sulfonation reaction, the particles are separated from the liquid reaction medium by filtration, centrifugation, decantation, or the like. This final, second resin product is carefully washed with dioxane, water, 1M NaOH, water, 1M HCl and water, and then dried, so that as usually prepared, the phosphonate R group is hydrogen.

The sulfonation reaction and work-up in water also hydrolyzes the phosphonate $C_1$–$C_8$ alkyl ester groups. Where sulfonation is not carried out, hydrolysis of the phosphonate esters can be carried out by reaction with an acid such as concentrated hydrochloric acid at reflux.

These contemplated particles contain as functional groups both methylene diphosphonate and sulfonate groups, directly attached to carbon atoms of aromatic units in the cross-linked polymer matrix. A contemplated resin displays high affinity towards a wide range of divalent, trivalent and other multivalent cations over a wide range of pH values.

At a pH value below 1, the resin particles are able to switch from an ion-exchange mechanism of cation removal to a bifunctional ion-exchange/coordination mechanism due to the coordination ability of the phosphoryl oxygens. The sulfonic acid groups then act to make the matrix more hydrophilic for rapid metal ion access; the methylene diphosphonate groups are thus responsible for the high selectivity, particularly of cations having a valence of +3 or more.

At a pH value near neutral to slightly basic (e.g., pH value of 8), contemplated ion exchange particles become less selective, and bind most divalent species about 10 to about 100 times more strongly than at a pH value below 1. The binding ability for trivalent ions does not increase similarly at those higher pH values, so selectivity diminishes.

A contemplated precursor insoluble copolymer can be prepared neat, in the absence of solvent or diluent by bulk polymerization techniques, or in the presence of a solvent or dispersing agent. A liquid solvent/dispersant is preferred here for use in a suspension polymerization so that the copolymer is prepared in the form of particles having a generally spherical shape; i.e., as beads, and a relatively narrow size distribution. Copolymer produced by bulk polymerization is typically broken to particles of irregular shape and a wide size distribution.

A contemplated copolymer and completed particle can have a size such that the particles pass through a sieve having a 4 millimeter (mm) opening and are retained on a sieve having an opening of about 0.004 mm. Particles that are sized to pass through a sieve screen with an opening of about 0.15 mm and be retained on a mesh of 0.004 mm are particularly useful for chromatographic separations. Larger sized particles are particularly useful for ion separations wherein the resin particles are filtered to effect a physical separation of one complexed polyvalent metal ion from one or more other mono- or polyvalent metal ions.

The preparation of ion-exchange/coordination particles containing both methylene diphosphonate and sulfonate groups on insoluble, cross-linked copolymers as herein described permits the production of materials having enhanced selectivity and improved kinetics of cation removal, especially in a low pH value range, than it has heretofore been obtained by the introduction of methylene diphosphonate or sulfonate groups alone.

The third type of ion exchange particles are copolymers described in Sundell et al., *Chem. Mater.*, 5:372–376 (1993) and Sundell et al., *Polym. Prep.*, 33:992 (1992) that are said to be useful as catalyst supports. These are terpolymers prepared by copolymerizing styrene, 1-(vinylphenyl)propane-2,2-bis(phosphonic acid) and divinylbenzene. In one reported synthesis, a microemulsion was prepared by the addition of water (0.26 g) to a styrene (23.52 mmol)/divinylbenzene (15.71 mmol) mixture containing bis (2-ethylhexyl) sulfosuccinate sodium salt (0.675 g) . The above 1-(vinylphenyl)propane-2,2-bis(phosphonic acid) (1.4 mmol) was added portionwise to the microemulsion. The microemulsion was maintained at 30° C. until optically clear. Azobisisobutyronitrile (24 mg) was added, the reaction vessel was closed and polymerization was initiated by heating to a temperature of 60° C. for 12 hours. The resulting porous copolymer was then ground to form particles.

More recently, Sundall et al., *Reactive Polymers*, 1:1–16(1995) reported synthesis of gem-diphosphonate polymers grafted onto 200 μm polyethylene films. Grafting was accomplished by irradiation of the film, which also produced cross-links in the polyethylene, followed by immersion of the irradiated film in vinyl benzyl chloride, and then reaction with methylenebisphosphonate ester anions. After ester hydrolysis, the phosphorous-containing groups were present on a linear polymer backbone that was grafted on to a cross-linked planar support. These materials reportedly contained phosphorous at about 3.1 mmol/g of grafted polymer, with grafting amounts being reported at about 200–270 percent of the film weight. These planar materials were also reported to be difficult to prepare and are not used herein.

Contact between the solution and ion exchange particles is maintained for a time period sufficient for the particles to bind iron(III) ions. Because of the tight binding (affinity) observed between iron(III) ions and the ion exchange particles, binding to a given particle is quite rapid and may be diffusion controlled.

However, when used in large quantities or even for accurate laboratory studies of binding coefficients, one to two or even more hours can be used to load the ion exchange particles with iron(III) ions. Thus, the maintenance time utilized can depend upon the user's purposes as well as the individual batch of ion exchange particles. Useful times for contacting can be readily determined by carrying out distribution studies similar to those illustrated hereinafter and in U.S. Pat. No. 5,449,462 and No. 5,281,631 with varying maintenance times for loading the particles with a constant amount of iron(III) ions and a given set of stripping conditions.

In typical practice, the amount of ion exchange particles and concentration of iron(III) to be removed are paired so there is an excess of exchange capacity over the equivalents of iron(III) ions to be removed. Such a pairing minimizes the likelihood that some iron(III) ions will not be separated and removed. Of course, if some iron(III) is desired or can be tolerated, the iron(III) ions can be present in excess over the exchange capacity of the ion exchange particles.

After the solid phase-bound iron(III) ions and aqueous sulfuric acid-containing liquid phase have been formed during the maintenance step, the solid and liquid phases are separated. In a batch process, the solid and liquid phases can be physically separated by simple decantation or centrifugation followed by decantation or other removal of the liquid phase. It is preferred to rinse the separated solid phase with about 1 to about 3 molar aqueous sulfuric acid, with the washings added to the separated liquid phase.

In a preferred process where the ion exchange particles are contained in one or more columns, the solid and liquid phase separation is effected by elution. The eluting solution is the above about 1 to about 3 molar sulfuric acid.

The separated liquid phase contains the metal ions of valence less than +3 that did not bind to the particles. In a copper electrowinning situation, copper(II), cobalt(II) and iron(II) ions are present as may be manganese(II) ions. This separated liquid phase can then be returned for further electroplating or to the solvent extraction plant.

It can be desirable to remove iron(II) ions as well as iron(III) ions from the process stream. As noted elsewhere, in a copper EW process, iron(II) ions can constitute about 15–25 percent of the total iron ions present. A simple oxidation with a mild oxidant such as hydrogen peroxide can be used to convert iron(II) ions to iron(III) ions in the aqueous sulfuric acid metal ion-containing solution prior to the above contacting step so that additional iron ions can be separated and removed from the solution in the iron(III) form.

The separated solid phase contains bound iron(III) ions that must be removed so that the ion exchange particles can be regenerated and reused. Initial studies showed that increasing concentrations of sulfuric acid could remove up to about 35 percent of the bound iron(III) ions at 65° C. in about one hour. However, sulfuric acid concentrations of 8 molar and above damaged the particles. Increasing temperatures with a constant sulfuric acid concentration between about 50° C. and 85° C. also increased regeneration, but regeneration was still insufficient to be useful in a commercial setting.

It was determined that the ion exchange particles could be regenerated if the iron(III) ions could be reduced to iron(II) ions that are free in solution. Reduction of the iron(III) ions by a reductant such as sulfurous acid was also inefficient. However, when copper ions in at least a catalytic amount were added, the efficiency of the sulfurous acid reductant ion exchange particle regeneration [iron(III) stripping] increased to a useful level.

The copper ions can be copper(I) or copper(II) ions, although it is believed that the active reductant is the copper(I) ion. In one preferred embodiment, the copper ions are provided by use of the above-separated liquid phase, or a diluted solution thereof, or from a copper sulfate solution prepared expressly for the purpose of providing these copper ions.

In another embodiment, a solution of sulfuric acid containing copper(II) ions is first passed over copper metal and the resulting solution containing dissolved copper is used for the reduction upon addition of sulfurous acid.

The sulfuric acid concentration of this reducing is typically about 0.5 to about 6 molar, with a concentration of about 1 to about 3 molar being preferred.

As noted above, the amount of copper ions present can be from a catalytic amount upward to an amount present in the spent electrolyte used in separating and removing iron(II) ions, i.e., about 35 liter (g/L). More preferably copper ions are present in an amount of about 0.5 to about 7 g/L, and most preferably in an amount of about 1 to about 5 g/L.

Without wishing to be bound by theory, the following forward equations are thought to describe the mechanism of iron reduction and stripping from a contemplated ion exchange particles, where (Bound) indicates a species bound to the particles and (aq) indicates a species in the aqueous phase.

$$2Fe^{3+}_{(Bound)}+H_2SO_3+H_2O \rightarrow 2Fe^{2+}_{(aq)}+2H^+_{(Bound)}+H_2SO_4 \quad (1)$$

This main reaction (1) can be expanded into the following three equations, where copper ions are in the aqueous phase at all times.

$$2Fe^{3+}_{(Bound)}+2H^+ \rightleftharpoons 2Fe^{3+}_{(aq)}+2H^+_{(Bound)} \quad (2)$$

$$2Cu^{2+}+H_2SO_3+H_2O \rightarrow 2Cu^++H_2SO_4+2H^+ \quad (3)$$

$$2Fe^{3+}_{(aq)}+2Cu^+ \rightarrow 2Fe^{2+}_{(aq)}+2Cu^{2+} \quad (4)$$

In accordance with equation (2) above, it is believed that it is the iron(III) that is free in solution and in equilibrium with bound iron(III) that actually undergoes reduction. That equilibrium is further believed to lie far to the left, due to the tight iron(III) ion binding observed, so relatively little of the iron(III) is actually in the aqueous phase at any time. Thus, the reduction observed is a slow process.

As noted earlier, the temperature at which regeneration (stripping) is carried out also plays a role in process efficiency. It has been found that a temperature of about 85° C. is maximal for stripping due to pressure considerations and the fact that copper sulfide is inexplicitly formed on fittings at 85° C. It is preferred that the ion exchange regeneration step be carried out at a temperature of about 65° C., and more preferably at a temperature of about 65° C. to about 75° C., temperatures at which copper sulfide was not observed to be formed.

The amount of sulfurous acid present is that amount that is sufficient to reduce the bound iron(III) ions to iron(II) ions so that at least 50 percent of the ion exchange particles are regenerated. In preferred practice, that amount is about 0.3 to about 1.0 molar, and is more preferably about 0.6 to about 0.8 molar as $SO_2$. The limit of solubility of sulfurous acid in a contemplated sulfuric acid solution is about 1.1 molar, so an amount from stoichiometric up to saturation can be utilized.

It is noted that sulfurous acid can be provided by a solution of preformed sulfurous acid, or $SO_2$ gas can be added to the sulfuric acid solution to provide the sulfurous acid. In addition, alkali metal and ammonium bisulfites and sulfites form sulfurous acid when admixed with sulfuric acid so the sulfurous acid utilized can be formed in situ by addition of sodium sulfite, ammonium bisulfite or the like to the sulfuric acid solution. Previously prepared sulfurous acid or added $SO_2$ gas are preferred for providing the sulfurous acid.

The second solid/liquid phase admixture formed is maintained at a temperature such as about 65° C. to about 85° C. and for a time period sufficient to form regenerated solid phase ion exchange particles and a liquid phase containing aqueous sulfuric acid and iron(II) ions to form. Contrary to most ion exchange loading and stripping situations, the stripping (regeneration) step is slower here than is the loading step. This is presumably because only a very low concentration of reducible iron(III) ions are present in an unbound state in the aqueous phase of any time due to the high affinity of these ion exchange particles for iron(III), as was noted before.

The time required to regenerate the ion exchange particles is a function of a number of variables as has already been discussed. In addition, that time is a function of the amount of regeneration desired. In a commercial setting that desired regeneration is typically about 50 percent. Maximal stripping (regeneration) typically takes about 60 to 90 minutes for a laboratory set up as is described hereinafter. In a pilot or full scale commercial setting, regeneration times are typically about 90 to about 240 minutes.

The regenerated solid phase ion exchange particles are then separated from the iron(II)-containing liquid phase. This separation of phases can be carried out as discussed before, however, in preferred practice where the solid phase ion exchange particles are contained within one or more columns, that phase separation is carried out by elution.

A process of the invention is illustrated by the following non-limiting examples.

Example: Batch Strip Studies

Many batch studies have been performed with varying concentrations of $H_2SO_4$, $H_2SO_3$, and $CuSO_4$, as well as different temperatures and contact times. From these studies, it is clear that each of these components has a significant effect on the amount of iron that can be stripped from EIHROM's DIPHONIX™ ion exchange particles that were obtained from Eichrom Industries, Inc., Darien, Ill.

One gram of 100–200 mesh EICHROM'S DIPHONIX ion exchange particles was weighed out into centrifuge tubes after drying with a Bechner funnel for five minutes. These samples were then contacted with a 1000 ppm $Fe^{3+}$ in 1.5 M $H_2SO_4$ solution for 60 minutes to load the particles. The load solution was then drained and the particles rinsed with 1.5 M $H_2SO_4$. The particles were loaded with an average of 10 mg of $Fe^{3+}$, as calculated from the difference in $Fe^{3+}$ concentrations before and after loading, and were ready to be stripped.

For the strip solutions, each of the variables was examined, and the best combination was sought to achieve total stripping of the iron from the particles. The data obtained illustrate the effect of changing each variable on the stripping ability.

Looking first at the concentration of copper in the form of $CuSO_4$, it is seen below, that as the amount of copper increases, so does the amount of iron stripped.

| Molarity $H_2SO_4$ | Molarity $H_2SO_3$ | g/L Copper | Time (min.) | Temp. (°C.) | % Fe Stripped |
|---|---|---|---|---|---|
| 1.0 | 0.64 | 1.0 | 60 | 65 | 33 |
| 1.0 | 0.64 | 3.0 | 60 | 65 | 34 |
| 1.0 | 0.64 | 5.0 | 60 | 65 | 38 |
| 2.0 | 0.64 | 5.0 | 60 | 75 | 52 |
| 2.0 | 0.64 | 7.0 | 60 | 75 | 53 |

Thus, increasing the copper concentration increases the amount of iron stripped off the particles up to a point. However, the second set of data show no significant change at greater than 5 g/L copper.

Time also has a considerable effect on the amount of iron that can be striped off the particles. As the time frame the particles and strip solution are in contact with each other increases, more iron is stripped off the particles. Maximum iron stripping was observed after 60–90 minutes.

| Molarity $H_2SO_4$ | Molarity $H_2SO_3$ | g/L Copper | Time (min.) | Temp. (°C.) | % Fe Stripped |
|---|---|---|---|---|---|
| 2.0 | 0.64 | 5.0 | 30 | 75 | 38 |
| 2.0 | 0.64 | 5.0 | 60 | 75 | 52 |
| 2.0 | 0.64 | 5.0 | 90 | 75 | 56 |
| 2.0 | 0.64 | 5.0 | 120 | 75 | 56 |

The effect of temperature was examined at 65°, 75°, and 85° C. Initial studies showed temperatures below about 65° C. were insufficient for desired iron stripping, whereas temperatures above about 85° C. might damage the ion exchange particles and can elevate $SO_2$ gas pressures above those pressures useful for standard glass equipment. Batch studies carried out at 85° C. appeared to give the best results.

| Molarity $H_2SO_4$ | Molarity $H_2SO_3$ | g/L Copper | Time (min.) | Temp. (°C.) | % Fe Stripped |
|---|---|---|---|---|---|
| 2.0 | 0.64 | 5.0 | 90 | 65 | 41 |
| 2.0 | 0.64 | 5.0 | 90 | 75 | 56 |
| 2.0 | 0.64 | 5.0 | 90 | 85 | 68 |

The effect of sulfurous acid concentration was studied at three different concentrations of 0.38 M and 0.64 M, and at 0.90 M. Sulfurous acid is only about 1.1 M in its most concentrated form.

| Molarity $H_2SO_4$ | Molarity $H_2SO_3$ | g/L Copper | Time (min.) | Temp. (°C.) | % Fe Stripped |
|---|---|---|---|---|---|
| 2.0 | 0.38 | 0.025 | 30 | 50 | 20 |
| 2.0 | 0.64 | 0.025 | 30 | 50 | 24 |
| 2.0 | 0.90 | 5.0 | 60 | 85 | 59 |
| 2.0 | 0.38 | 0.025 | 60 | 65 | 32 |
| 2.0 | 0.64 | 0.025 | 60 | 65 | 36 |
| 2.0 | 0.90 | 5.0 | 90 | 85 | 69 |

Thus, increasing the sulfurous acid concentration increases the amount of iron stripped from the particles, and this finding applies for different temperatures and times.

The last variable studied was the concentration of sulfuric acid. Again as the concentration increased, so did the amount of iron stripped.

| Molarity $H_2SO_4$ | Molarity $H_2SO_3$ | g/L Copper | Time (min.) | Temp. (°C.) | % Fe Stripped |
|---|---|---|---|---|---|
| 0.1 | 0.38 | 0.025 | 30 | 65 | 17 |
| 1.0 | 0.38 | 0.025 | 30 | 65 | 20 |
| 1.5 | 0.38 | 0.025 | 30 | 65 | 25 |
| 2.0 | 0.38 | 0.025 | 30 | 65 | 28 |

Another study was done using just sulfuric acid to see if the sulfurous acid and copper were even necessary for stripping.

| Molarity $H_2SO_4$ | Time (min.) | Temp. (°C.) | % Fe Stripped |
|---|---|---|---|
| 2.0 | 60 | 65 | 17 |
| 3.0 | 60 | 65 | 23 |
| 4.0 | 60 | 65 | 28 |
| 5.0 | 60 | 65 | 23 |
| 6.0 | 60 | 65 | 31 |
| 8.0 | 60 | 65 | 34 |

The ion exchange particles were destroyed with the 8.0 M sulfuric acid. Sulfuric acid at about 6.0 M appears to be the limit these ion exchange particles can withstand for a long time period at the high temperatures used without degradation.

After studying all the data, multiple stripping of some of the better performing strip solutions was examined. These findings are shown below.

| Molarity $H_2SO_4$ | Molarity $H_2SO_3$ | g/L Copper | Time (min.) | Temp. (°C.) | % Fe Stripped 1 | % Fe Stripped 2 | Total Stripped |
| --- | --- | --- | --- | --- | --- | --- | --- |
| 2.0 | 0.64 | 5.0 | 30 | 75 | 38 | 24 | 62% |
| 2.0 | 0.64 | 5.0 | 60 | 75 | 52 | 21 | 74% |
| 2.0 | 0.64 | 5.0 | 90 | 75 | 56 | 27 | 83% |
| 2.0 | 0.64 | 5.0 | 120 | 75 | 56 | 21 | 78% |

| Molarity $H_2SO_4$ | Molarity $H_2SO_3$ | g/L Copper | Time (min.) | Temp. (°C.) | % Fe Stripped 1 | % Fe Stripped 2 | % Fe Stripped 3 | Total Stripped |
| --- | --- | --- | --- | --- | --- | --- | --- | --- |
| 2.0 | 0.64 | 5.0 | 90 | 75 | 56 | 27 | 17 | 100% |

Although total removal of the iron from the particles could be achieved in three consecutive strips, use of three stripping steps is not economically acceptable. The goal is to remove sufficient iron from the particles to regenerate at least 50 percent of the particles, and it would be advantageous to do that in one strip session. The best strip solution found in these laboratory batch studies is a solution at 85° C. made up of 2 M $H_2SO_4$, 0.64 M $H_2SO_3$, and 5 g/L copper. The contact times are dependent upon the amount of iron removal needed per application.

Figure 5:
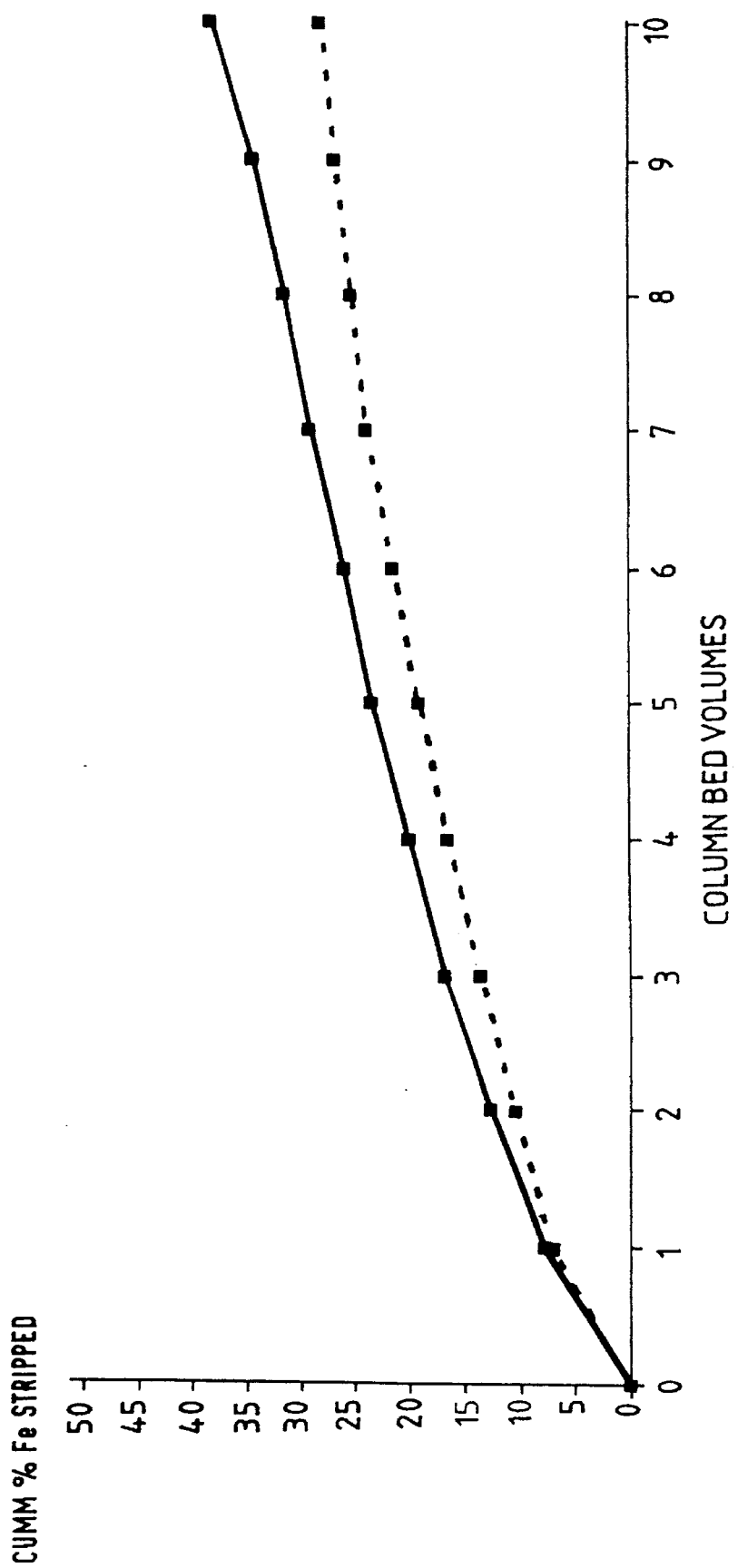
FIG. 5 is a graph showing the percentage of loaded $Fe^{3+}$ ions stripped from one or the other of two loaded ion exchange resin particle columns as a function of column bed volumes of eluting solution. Both columns contained aliquots of the same ion exchange particles, similar amounts of loaded $Fe^{3+}$ ions, and were eluted at the same temperature (75° C.) and same rate. Column 1 (dotted line) was eluted with an aqueous solution containing 1 g/L $Cu^{2+}$ ions in 180 g/L $H_2SO_4$, whereas column 2 (solid line) was eluted with the same solution that was passed over copper metal shot (1–2 mm) prior to being contacted with the loaded column.

In another laboratory study, two columns were prepared, each containing 10 g of 100–200 mesh EICHROM'S DIPHONIX™ ion exchange particles and having a load of 113.6 and 93.1 mg of iron(III) ions, respectively. The first column was regenerated at 75° C. using a solution containing 1 g/L $Cu^{2+}$ ions and 180 g/L $H_2SO_4$ with a strip rate of 30 mL/hour. The second column was stripped at the same temperature and rate with the above solution that had first been passed through a 50 g bed of 2–4 mm copper metal shot prior to entering the column. The percentages of originally bound iron(III) that eluted from the two columns were plotted together as a function of column eluate as is shown in FIG. 5. As is seen from FIG. 5, prior passage over the copper shot enhanced regeneration. This is presumed to be because of the equilibrium amount of $Cu^{1+}$ formed in the solution by passage of the acidic cupric sulfate solution over the copper shot [see equation (3), above]. The copper shot was visibly brightened after that passage, indicating that some dissolution had occurred.

Example 2: Laboratory Studies with Plant Electrolytes

Further studies were conducted using the particles contained in columns to separate and recover iron from actual SX-EW electrolyte bleed solutions.

Initial studies with simulated copper electrolyte solutions using a column separation apparatus showed that ion exchange particles were selective for $Fe^{3+}$ over $Cu^{2+}$ and $Co^{2+}$. These results can be seen from the loading curves in FIG. 1 wherein $C/C_o$ represents the ratio of processed solution concentrations (C; column effluent) to initial metal ion concentrations ($C_o$, column feed) in the synthetic electrolyte. A $C/C_o$ value less than one indicates species retention, $C/C_o$ equal to one indicates no retention, and $C/C_o$ greater that one indicates displacement of a previously retained metal into the effluent.

As the first column bed volume of electrolyte solution reached the outlet sample point, the value for $C/C_o$ rapidly approached one for copper and cobalt in this solution, indicating that the ion exchange particles did not retain copper and cobalt in strong acid solutions (150 g/L $H_2SO_4$). Ferric ion $C/C_o$ values remained low until the particles' geminal diphosphonic acid binding sites were exhausted after passage of more than ten bed columns of liquid, indicating that the particles were retaining a large fraction of the iron.

Figure 2:
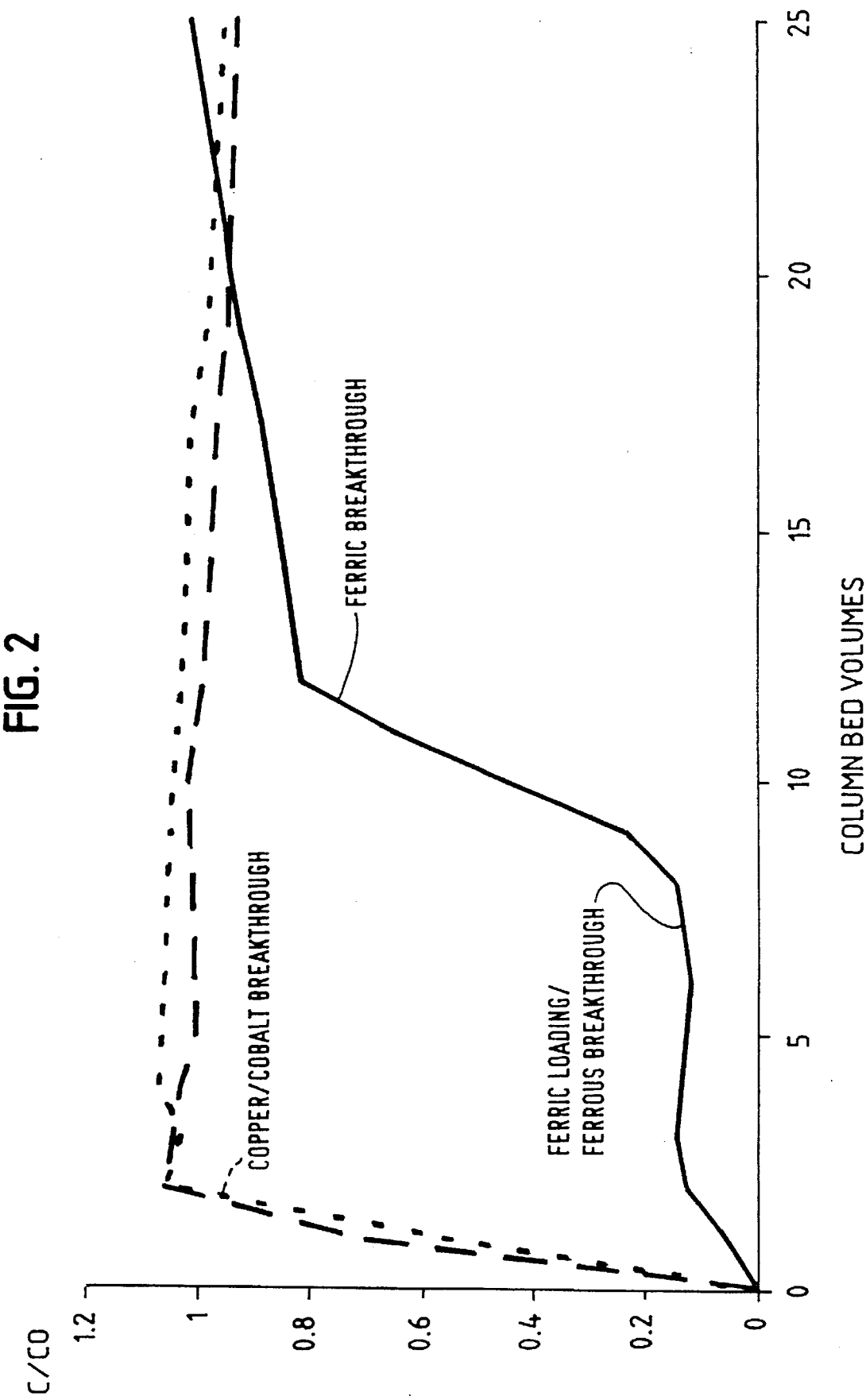
FIG. 2 is a graph similar to that of FIG. 1 in which an actual SX-EW plant electrolyte bleed was utilized. Axes and data are as in FIG. 1. Initial concentrations were: $Fe^{3+}$=1200 mg/L (solid line); $Cu^{2+}$=33 g/L (dotted line); and $Co^{2+}$=72 mg/L.

Additional laboratory studies with the ion exchange particles were performed using actual SX-EW plant electrolytes (FIG. 2). It is noted that some iron was observed in the initial column effluent, $C/C_o \approx 0.20$. Ferrous ions [di-valent iron; iron(II)] were expected to be present in copper electrolyte at concentrations of 15–25 percent of the total iron and to exhibit behavior analogous to cobalt and copper by not loading on the ion exchange particles.

A number of laboratory column load/strip studies were performed with plant electrolyte. The observations from these studies indicated no loss of ion exchange particle capacity. The net operating capacity of the ion exchange particles was observed to be 6–8 mg $Fe^{3+}$/g particles with an estimated stripping (regeneration) efficiency of 70–80 percent of the loaded iron per cycle.

The concentration effects of sulfurous acid, sulfuric acid and copper(II), and effects of stripping time and temperature were all quantified in the batch laboratory studies discussed before. Stripping conditions of 2 M $H_2SO_4$, 0.6–0.8 M $H_2SO_3$, 1–2 g/L $Cu^{2+}$, 85° C., and a three-hour strip time were chosen as initial parameters for a pilot study based on the laboratory studies. In the laboratory studies it was observed that stripping efficiency dropped to approximately 25 percent when copper was eliminated from the stripping solution.

Example 3: Pilot Plant Studies

Ion exchange resins are generally used for industrial applications in fixed beds. A typical application specifies a given flow rate of solution to be processed. Two identical beds are provided, each having the capability to treat the required flow. Each resin bed has a finite capacity and can only process fluid for a given time period. When the loading time period expires, the resin bed is said to be exhausted and regeneration is required. During the regeneration of the initial bed, the second unit takes over the treatment requirement. The second unit processes fluid until that unit too is exhausted and the first bed is returned to service.

In ion exchange operations, the loading time frame is typically longer than the regeneration (stripping) process. When this time disparity exists, the off-line second unit remains in standby. Obviously, the resin in the standby column is not being used efficiently in the operation during this time. A more economical use of the ion exchange resin would occur if all of the resin volume were in active service at all times.

Equipment manufactured by Advanced Separations Technology (AST) of Lakeland, Fla. fills the need of efficient resin usage and offers additional operating benefits in the application of ion exchange particles for the control of iron in a copper electrowinning electrolyte. It was observed in the laboratory studies that contrary to typical ion exchange processes, the iron removal system is "regeneration limited". That is, the portion of the cycle where the metal (iron) is reduced and eluted from the ion exchange particles takes about twice as long as the loading (exhaustion) portion. If fixed bed equipment were to be specified for this application, at least three particle beds would be required to have one bed available to process electrolyte (one loading, two stripping). The AST equipment has the flexibility to permit any fraction of the ion exchange particles to be loading, with the remaining particles being regenerated.

AST provided an ISEP® continuous contactor for a pilot demonstration that was conducted at the Magma Copper (SX-EW plant) in San Manuel, Ariz. over a two-month time period. This contactor consists of 30 fixed bed columns, each measuring approximately one inch in inside diameter and four feet in length. The columns rotate at a constant speed on a carousel arrangement through 20 stations of operation (ports). Solution flows through a port into a column of ion exchange particles and exits through a corresponding port at the other end of the column into the other distributor. Fluid flow through any given port is always constant.

Three distinct operating zones are used during the iron control process: the adsorption (loading) zone (ports 3–8), the rinse zones (ports 1–2 and 9–10) and the elution (regeneration; stripping) zone (ports 11–20). In one revolution of the carousel, each of the particle-filled columns completes an entire process cycle (load/rinse/strip/rinse).

The carousel was enclosed in an insulated box to prevent convective heat loss from the columns in the strip zone that were being maintained at elevated temperature (65°–85° C.). A steam-heated heat exchanger over which forced air was circulated to the equipment box was used for this purpose, whereas a shell and tube heat exchanger was used to maintain the elevated temperature of the circulating strip solution.

The optimal use of the twenty ports was determined with help from the manufacturer based on the timing requirement of each of the processing steps. This port use is summarized in the following table:

(c) Rinsing the strip solution off of the particles in ports 9 and 10 eliminates the potential for contaminating the load solution with reductant.

(d) Because stripping is the most time-consuming part of the process, one-half of the available ports are allocated to this portion of the rotation cycle. The reductive stripping was found to be most efficient when operated in a countercurrent flow regime. Countercurrent flow was achieved in an upflow arrangement. The feed point of reductant solution into ports 11/12 was the last stage of stripping before the columns returned to loading, exposing the mostly regenerated [iron(III)-free] particles to the strongest reductant at the final step of the stripping process. Similarly, the particles in ports 19/20 had the highest bound iron(III) concentration and the lowest reductant concentration. It was observed during the pilot study that the solution in the strip zone had a distinct ferrous green color, which increased through the strip zone.

For the pilot study, approximately 15 liters of 50–100 mesh ion exchange particles were distributed evenly among 30 glass columns in the ISEP® continuous contactor. The particles were pre-shrunk with 10 weight percent sulfuric acid before installation into the columns. Initially, the columns were kept about two-thirds full, because there was concern that water could enter the unit, swell the beads and restrict fluid flow. Higher flow rates were maintained initially to ensure complete displacement of the freeboard solution. One month into the pilot program, further particles were added to the columns to eliminate the significant freeboard above the particle beds. Eliminating this freeboard permitted adjustment of the flow rates of the various process streams. With less freeboard to displace from each column, faster rotation of the resin carousel could be accommodated. Increased rotation of the ion exchange particle cells in the equipment was an important variable that needed to be studied for the optimization of the process. Efficient iron

| Port Nos. | Function | Inlet Fluid | Flow Direction | Temperature Recruited |
|---|---|---|---|---|
| 1–2 | Electrolyte Displacement | 1.5 M Sulfuric Acid | Downflow Series | Ambient |
| 3–8 | Loading of Iron From Electrolyte | Electrolyte | Downflow Parallel | Process Temperature |
| 9–10 | Strip Solution Rinse | 1.5 M Sulfuric (from Port 2) | Downflow Series | Ambient |
| 11–20 | Iron Stripping from Resin | 1.5 M Sulfuric Acid (from Ports 9/10) and 2.0 M Sulfuric Acid plus 0.6–0.8 M Sulfurous Acid | Upflow in Series Adjacent Ports in Parallel (11/12, 13/14, etc.) | >65° C. |

This arrangement provided the following operating benefits:

(a) Displacing the electrolyte off of the columns with fresh sulfuric acid in ports 1 and 2 removes excess freeboard iron from the resin. Iron present in solution and subsequently entering the strip zone depletes the reductant concentration required for releasing iron from the resin. Rinsing ports 1 and 2 also serves to displace a small amount of copper into the strip zone. As mentioned before, at least small amounts of copper are necessary for efficient reduction of the loaded iron.

(b) Operating the six ports of the loading zone in a parallel downflow arrangement permits processing a maximum electrolyte volume.

loading and stripping were demonstrated at a number of rotation rates. The cycle data provide the basis for the optimization and calculation of resin inventories and equipment sizing for commercial scale installations of this iron removal process.

Four 50 gallon tanks were used to contain the wash/rinse solutions (1.5 M $H_2SO_4$) and the strip feed [2M $H_2SO_4$+ (0.5–1.0 M) $H_2SO_3$]. The acid concentrations of the solutions for the wash/rinse and strip were determined by measuring the specific gravity of the solutions. A titration test was used to determine the concentration of $SO_2$ sparged into the strip solutions. As an additional control, each tank was placed on a scale so that the weight change could be used to correlate fluid flow as indicated on the pump controllers. The sulfur dioxide gas cylinder was also placed on a scale to allow control of the amount of gas sparged to the strip solution.

Pilot Study Results

More than 200 sequential cycles of iron loading/stripping were performed with the ion exchange particles in the pilot study. The copper electrolyte that was used as the feed solution was taken from the solvent extraction circuit containing lean (depleted) electrolyte (so-called D train at the Magma Copper facility). The approximate composition of this stream during the study period and the ranges observed are shown below:

|  | Average | Range |
|---|---|---|
| Iron (g/L) | 1.5 | 1.2–1.9 |
| Copper (g/L) | 39.3 | 36.8–43.2 |

The iron loading capacity of the ion exchange particles was evaluated with respect to the following changes in operating parameters during cycle testing:
(a) Strip solution concentration and temperature;
(b) Lean electrolyte (feed) solution flow rate;
(c) Total strip and rinse solution flow rate; and
(d) Pilot equipment rotational speed.

All effluent solutions from the pilot equipment were returned to the solvent extraction circuit. Solution samples were collected periodically from several ports on the ISEP® continuous contactor unit. These samples were analyzed for Cu, Fe, Co and Mn by atomic absorption spectrometry and acidity was determined by NaOH titration.

Significantly, net iron loading remained constant throughout the study. A downward trend in iron loading would have indicated particle fouling or deterioration.

During the pilot study, an analysis of the iron concentration at three different ports in the loading section, ports 3, 6, and 8, was used to monitor loading efficiency. Columns entering port 8 are leaving the stripping and rinsing zone, and their contained ion exchange particles should be completely regenerated. Iron removal with the freshly regenerated ion exchange particles should be dramatically evident from an analysis of the effluent from port 8.

Figure 3:
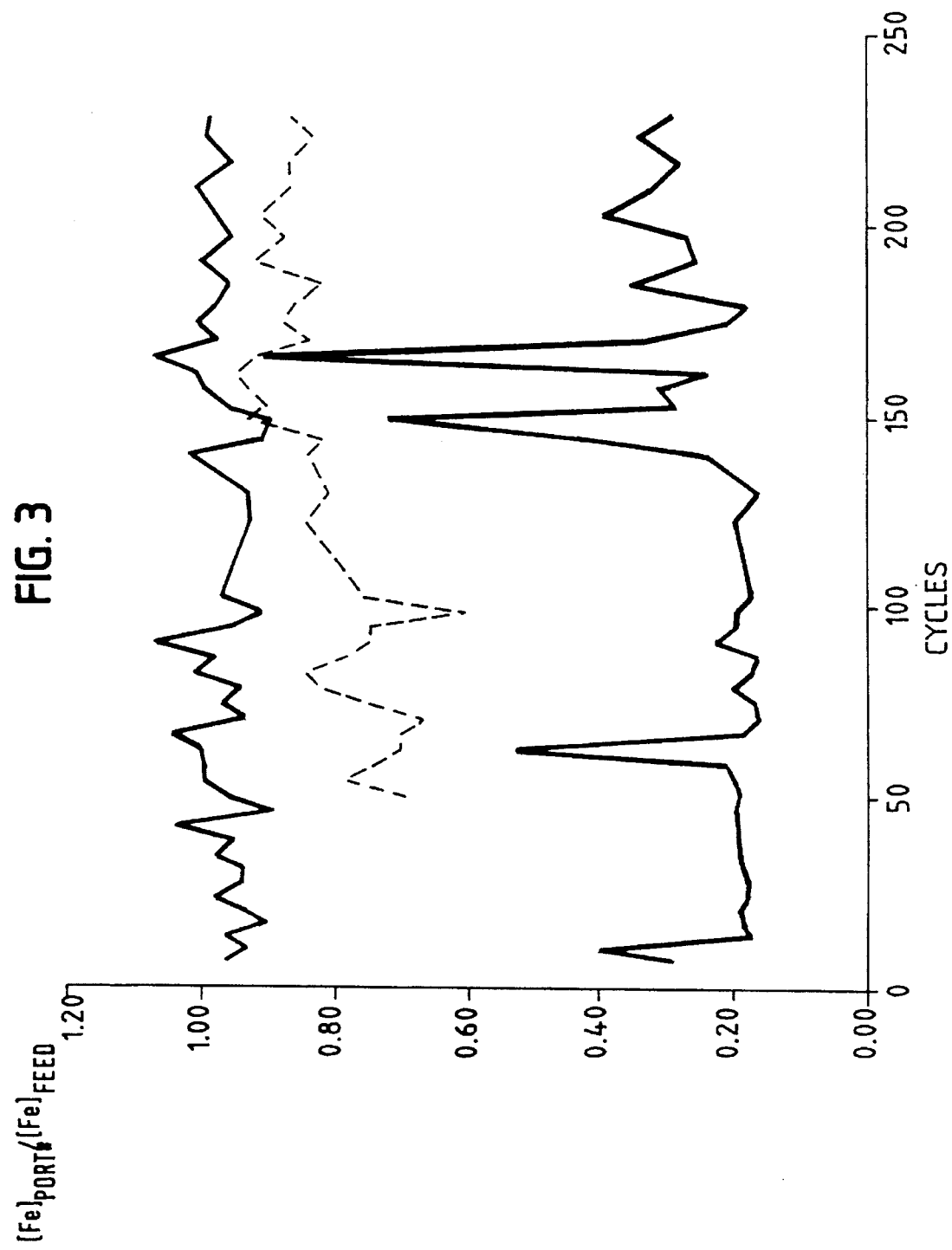
FIG. 3 is a graph of the ratio of iron concentrations at three different column outlet ports ($[Fe]_{port\#}$) of a rotating contactor used in a pilot plant study to the incoming iron concentration ($[Fe]_{feed}$) over more than 200 cycles of loading and regeneration. Data for the initial loading phase (port 8) are shown in the thick, solid line, and indicate the presence of about 25–40 percent $Fe^{2+}$ ions. Data for the intermediate loading (port 6) are shown as a dashed line. Data for fully loaded particles port 3) are shown as a thin, solid line.

The graphical representation of these data in FIG. 3 confirms that columns in port 8 remove essentially all of the ferric ion present in the solution. The 25–40 percent iron observed in the effluent from port 8 is the ferrous component of the total iron in the electrolyte. A high rate of iron removal at port 8 was a good indicator that stripping efficiency was being maintained and the ion exchange particles were being consistently regenerated.

Port 3 is the last column location in the electrolyte load zone. Ideally, effluent from port 3 should have an iron concentration identical to the feed electrolyte indicating that the full capacity of the ion exchange particles had been consumed in the load zone. Port 3 data in FIG. 3 are consistently around 1.0, indicating that the particles were being loaded completely and efficiently; i.e., ion exchange particle-bound iron(III) ions were appropriately formed. Port 6 was used to monitor intermediate loading progress approximately mid-way through the load zone.

The results discussed above indicate successful iron removal from copper electrowinning solutions with the use of EICHROM'S DIPHONIX ion exchange particles. Furthermore, the capacity of the ion exchange particles remained steady during a long term study (average net loading equaled 8–12 g Fe/L particles). The improved iron loading observed during pilot testing may be attributed to the more efficient counter-current stripping in the pilot unit. The counter-current stripping allows for full utilization of the $SO_2$.

Optimization of the ion exchange process was an important goal of the pilot study. Several attempts were made during the course of the study to optimize operating parameters. The following conclusions can be made from the successful pilot test program:

1. Lower Temperature Stripping—lower equipment and utility costs

Laboratory studies indicated a positive correlation of stripping efficiency with temperature. A temperature maximum for the strip section of approximately 85° C. was established prior to the start of the study. The partial pressure of $SO_2$ at this temperature is approximately 50 psig; the pilot equipment could be operated safely at this pressure without risk of $SO_2$ leakage.

It was observed that operating near the maximum temperature led to the formation of a copper sulfide precipitate (confirmed by analyses). This precipitate formed only in the outlet line from the heat exchanger. When the temperature was lowered to approximately 70° C., the precipitate disappeared. Copper sulfide formation did not cause any operation problems during the pilot test. No pressure drop, indicative of column fouling, was observed.

Acceptable stripping of iron could be achieved at temperatures of 65°–70° C. It was observed that iron removal efficiency decreased significantly when the strip section temperatures fell below 65° C.

2. $SO_2$ Consumption Minimized

The $SO_2$ addition rate to the strip solution that was most effective was at an amount that was about twice the stoichiometric requirement. Amounts in excess of this amount provided the necessary thermodynamic driving force during elution, because the chemical reactions discussed earlier [equations (2)–(4)] are likely rate limiting. It was determined that adequate stripping potential was realized with a minimum solution concentration of 0.6 M $SO_2$. This value can be used in estimating the size of the $SO_2$ storage equipment and annual gas cost for a commercial scale production unit.

3. Increased Equipment Rotation Speed—optimized resin inventory

More efficient use of the fixed volume of particles present in the unit was achieved as the rotational speed of the column contactor was increased. This demonstrated that there was room for improvement in the stripping regime originally developed under laboratory conditions.

Two primary benefits are derived from these data. First, the volume of particles required to remove a given mass of iron is reduced 10–20 percent from earlier calculations because of the improved ion exchange particle efficiency. Second, characterizing the effect of the rotational speed on iron removal permitted production unit systems designed to accommodate fluctuations in iron concentration in the copper electrolyte. By adjusting the rotational speed of the unit to greater than the initial design speed, short-term fluctuation in iron concentration can be controlled. This flexibility assists plant personnel in maintaining optimal operating conditions within the SX-EW plant.

Iron loading data expressed as [g/L·hr] were used to evaluate ion exchange particle productivity. Because iron stripping was known from the laboratory study to be temperature dependent, the data were selected from the complete set of data for periods of use when the pilot equipment temperature was stable. The following conclusions are derived from an analysis of the data:

(1) Reductant concentration above a minimal amount was not an important factor in stripping efficiency. Data points at a 5.5 hour cycle time, one with a 0.32 M $SO_2$ concentration and another with 0.80 M $SO_2$ showed identical stripping performance.

Figure 4:
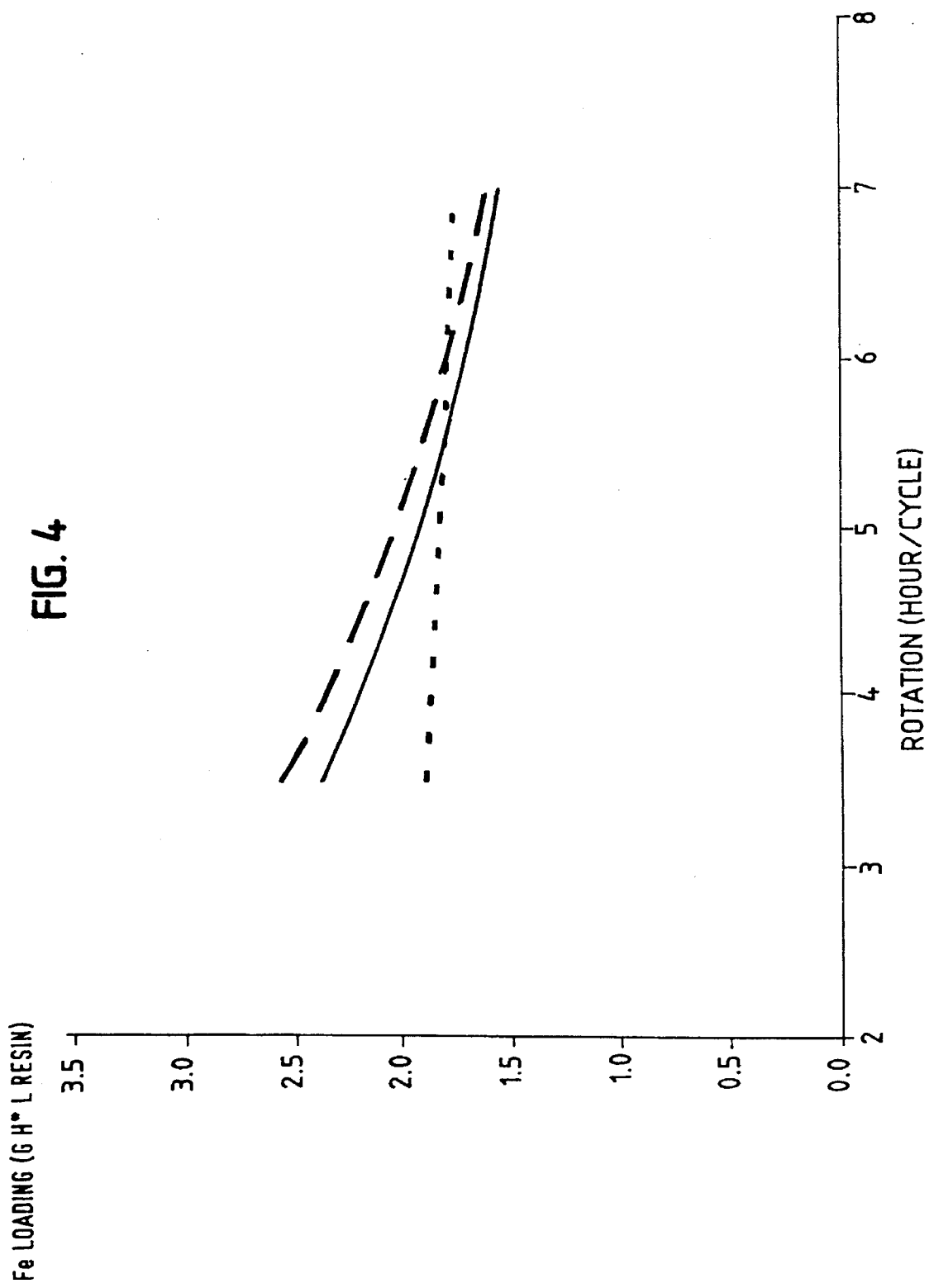
FIG. 4 is a graph showing the loading of iron by ion exchange resin particles in grams/hour·liter of resin as a function of the rotation time of the rotating contactor of FIG. 3 and at different temperatures. Data at a temperature between 65° C. and 75° C. are shown as a dotted line, whereas data taken at greater than 75° C. are shown as a dashed line. All of those data taken together are shown as a solid line.

(2) Operating the unit at faster rotational speeds improved resin productivity, as shown in FIG. 4. Even accounting for different temperature conditions, a fixed volume of particles was shown to extract more iron from electrolyte when the carousel rotated faster. This meant that reducing the amount of time allocated for stripping to 1.75 hours (one-half of the 3.5 cycle time) was still sufficient for removing iron from the particles. By exposing more particles to electrolyte solution using a faster equipment rotation rate, the volume of particles required for an initial installation in the unit can be decreased. The data support a particle volume reduction of 10–20 percent from initial projections.

The ability to strip iron from the particles at temperatures lower than 85° C. is also shown in FIG. 4. Lower temperature (65°<T<75° C.) and higher temperature (T≧75° C.) resin productivities are comparable.

Completion of these optimization studies permits the design of the most cost-effective production scale unit. The impact of verifying stripping performance at temperatures below 70° C. means that higher temperature materials of construction can be eliminated from a commercial plant design.

Sulfur dioxide, used to generate the sulfurous acid in the strip solution, is a significant operating cost item and optimization and minimization of this cost item was achieved in the pilot study. Accurate sulfur dioxide consumption can be calculated from the pilot data. Lastly, optimization of the equipment rotational speed permits maximum efficiency with respect to ion exchange particles usage. The volume of particles required in a commercial scale plant can be estimated with a high degree of confidence from the data graphed in FIG. 4.

The foregoing description and the examples are intended as illustrative and are not to be taken as limiting. Still other variations within the spirit and scope of this invention are possible and will readily present themselves to those skilled in the art.

We claim:

1. An ion exchange and regeneration process for the separation and removal of iron(III) ions from an aqueous sulfuric acid metal ion-containing solution that comprises the steps of:

(a) contacting an aqueous sulfuric acid metal ion-containing solution that contains iron(III) ions as well as ions having a valence of less than +3 of at least one additional metal with solid ion exchange particles that bind to said iron(III) ions in preference to the additional metal ions present to form a solid/liquid phase admixture, said ion exchange particles comprising insoluble cross-linked copolymer particles having a plurality of pendent geminal diphosphonate groups of the formula —$CH(PO_3R_2)_2$ or >$C(PO_3R_2)_2$, wherein R is a mono- or divalent cation;

(b) maintaining said contact with a sufficient amount of said solid ion exchange particles for a time period sufficient to form solid phase-bound iron(III) ions and an aqueous liquid phase containing sulfuric acid and said additional metal ions;

(c) separating the solid and liquid phases;

(d) contacting said separated solid phase-bound iron(III) ions with an aqueous reducing solution containing 0.5 to about 6 molar sulfuric acid, at least a catalytic amount of copper ions and an amount of sulfurous acid sufficient to reduce said solid phase-bound iron(III) ions to iron(II) ions to form a second solid/liquid phase admixture;

(e) maintaining said second solid/liquid phase admixture at a temperature of about 65° C. to about 85° C. for a time period sufficient to form an aqueous sulfuric acid liquid phase containing iron(II) ions and regenerated solid phase ion exchange particles; and (f) separating the iron(II)-containing liquid phase from the regenerated solid phase ion exchange particles.

2. The process according to claim 1 wherein the concentration of sulfuric acid in said aqueous sulfuric acid metal ion-containing solution is about 1 to about 3 molar.

3. The process according to claim 1 wherein said additional metal ions of said aqueous sulfuric acid metal ion-containing solution are selected from the group consisting of manganese(II), copper(II) and cobalt(II) ions.

4. The process according to claim 1 wherein said sulfurous acid is present in an amount of about 0.3 to about 1.0 molar as $SO_2$.

5. The process according to claim 1 wherein said aqueous sulfuric acid metal ion-containing solution also contains iron(II) ions.

6. An ion exchange and regeneration process for the separation and removal of iron(III) ions from an aqueous sulfuric acid metal ion-containing solution that comprises the steps of:

(a) contacting an aqueous sulfuric acid metal ion-containing solution that contains about 1 to about 3 molar sulfuric acid, iron(III) ions and additional metal ions selected from the group consisting of iron(II), manganese(II), copper(II) and cobalt(II) with solid ion exchange particles that bind to said iron(III) ions in preference to said additional metal ions to form a solid/liquid phase admixture, said ion exchange particles comprising insoluble cross-linked copolymer particles having a plurality of pendent geminal diphosphonate groups of the formula —$CH(PO_3R_2)_2$ or >$C(PO_3R_2)_2$, wherein R is a mono- or divalent cation;

(b) maintaining said contact with a sufficient amount of said solid ion exchange particles for a time period sufficient to form solid phase-bound iron(III) ions and an aqueous liquid phase containing sulfuric acid and said additional metal ions;

(c) separating the solid and liquid phases;

(d) contacting said separated solid phase-bound iron(III) ions with an aqueous reducing solution containing 0.5 to about 6 molar sulfuric acid, at least a catalytic amount of copper ions and sulfurous acid at a concentration of about 0.3 to about 1.0 molar as $SO_2$ to reduce the bound iron(III) ions to iron(II) ions and form a second solid/liquid phase admixture;

(e) maintaining said second solid/liquid phase admixture at a temperature of about 65° C. to about 85° C. for a time period sufficient to form an aqueous sulfuric acid liquid phase containing iron(II) ions and regenerated solid phase ion exchange particles; and (f) separating the iron(II)-containing liquid phase from the regenerated solid phase ion exchange particles.

7. The process according to claim 6 wherein said maintenance step (e) is carried out at a temperature of about 65° C. to about 75° C.

8. The process according to claim 6 wherein the copper ions of the aqueous reducing solution of step (d) are provided by passing an aqueous solution of copper(II) ions in sulfuric acid over copper metal prior to said contacting.

9. The process according to claim 6 wherein copper ions are present in said aqueous reducing solution in an amount of 0.5 to about 7 grams/liter.

10. The process according to claim 6 wherein sulfuric acid is present in said aqueous reducing solution at a concentration of about 1 to about 3 molar.

11. The process according to claim 6 wherein the concentration of sulfurous acid is about 0.6 to about 0.8 molar as $SO_2$.

12. The process according to claim 6 wherein said aqueous sulfuric acid metal ion-containing solution contains about 1 to about 10 grams/liter iron as iron(III) ions or a mixture of iron(II) and iron(III) ions, about 30 to about 50 grams/liter copper(II) ions and about 0.05 to about 0.2 grams/liter cobalt(II) ions.

13. The process according to claim 6 wherein at least 50 percent of the solid phase ion exchange particles are regenerated in step (e).

14. The process according to claim 6 wherein said ion exchange particles are contained in a column and each step of contacting and maintaining contact with said ion exchange particles is carried out within said column.

15. The process according to claim 14 wherein each separation of solid and liquid phases from a solid/liquid phase admixture is carried out by elution of the liquid phase from the column.

16. An ion exchange and regeneration process for the separation and removal of iron(III) ions from an aqueous sulfuric acid metal ion-containing solution that comprises the steps of:

(a) contacting solid phase ion exchange particles contained in a column with an aqueous sulfuric acid di- and trivalent metal ion-containing solution to form a solid/liquid phase admixture, said aqueous sulfuric acid di- and trivalent metal ion-containing solution containing (i) about 1 to about 3 molar sulfuric acid, (ii) about 1 to about 10 grams/liter iron as iron(III) ions or as a mixture of iron(II) and iron(III) ions, (iii) about 30 to about 50 grams/liter copper(II) ions and (iv) about 0.05 to about 0.2 grams/liter cobalt(II) ions, said solid phase ion exchange particles binding to said iron(III) ions in preference to the other enumerated ions, and comprising insoluble cross-linked copolymer particles having a plurality of pendent geminal diphosphonate groups of the formula $—CH(PO_3R_2)_2$ or $>C(PO_3R_2)_2$, wherein R is a mono- or divalent cation;

(b) maintaining said contact with a sufficient amount of said solid ion exchange particles for a time period sufficient to form solid phase-bound iron(III) ions and an aqueous liquid phase containing sulfuric acid and said divalent metal ions;

(c) elutingly separating the solid and liquid phases;

(d) contacting the column-contained solid phase-bound iron(III) ions with an aqueous reducing solution containing about 1 to about 3 molar sulfuric acid, copper ions present at about 0.5 to about 7 grams/liter and sulfurous acid present at a concentration of about 0.6 to about 0.8 molar as $SO_2$ to reduce the bound iron(III) ions to iron(II) ions and a form second solid/liquid phase admixture;

(e) maintaining said second solid/liquid phase admixture of about 65° C. to about 75° C. for a time period sufficient to form an aqueous sulfuric acid liquid phase containing iron(II) ions and a solid phase containing at least 50 percent regenerated solid phase ion exchange particles; and (f) elutingly separating the iron(II)containing liquid phase from the regenerated solid phase ion exchange particles.

17. The process according to claim 16 wherein said eluting separation of step (c) is carried out using an aqueous solution containing about 1 to about 3 molar sulfuric acid.

18. The process according to claim 16 wherein said eluting separation of step (f) is carried out using an aqueous solution containing about 1 to about 3 molar sulfuric acid.

19. The process according to claim 16 wherein the iron ions present in said aqueous sulfuric acid metal ion-containing solution are only iron(III) ions.

20. The process according to claim 16 wherein the copper ions of the aqueous reducing solution of step (d) are provided at a concentration of about 1 to about 5 grams/liter by passing an aqueous solution of copper(II) ions in sulfuric acid over copper metal prior to said contacting.

\* \* \* \* \*